R. D. PETERS.
FISH HOOK
APPLICATION FILED NOV. 23, 1915.

1,191,031.  Patented July 11, 1916.

Witness
Fedrick L. Fox.
C. C. Hines.

Inventor
Robert D. Peters.
By Victor J. Evans
Attorney

UNITED STATES PATENT OFFICE.

ROBERT D. PETERS, OF KNOX, INDIANA, ASSIGNOR OF FIFTEEN-SIXTEENTHS TO NELLIE V. PETERS, OF KNOX, INDIANA.

FISH-HOOK.

1,191,031.  Specification of Letters Patent.  Patented July 11, 1916.

Application filed November 23, 1915. Serial No. 63,018.

*To all whom it may concern:*

Be it known that I, ROBERT D. PETERS, a citizen of the United States, residing at Knox, in the county of Starke and State of Indiana, have invented new and useful Improvements in Fish-Hooks, of which the following is a specification.

This invention relates to improvements in fish hooks, and particularly to guards for retaining the bait in position upon the hook, and for preventing the hook from catching weeds or other obstructions when drawn through the water.

The particular object of my invention is to provide a guard, preferably consisting of an elastic band, connected with the barb and shank of the hook, to hold the bait from displacement and also render the hook weedless, or connected with the barb of the hook and with a weed guard attached to the shank for performing the functions described and increasing the efficiency of weedless hooks of that type provided with spring metal guards.

A further object of my invention is to provide a guard composed of an elastic band, which may be stretched out under a desired tension, and which may be connected with the barb of the hook or with the bill of the hook at any point along its surface, so that it may be arranged to hold the bait in position to the best advantage.

A still further object of the invention is to provide an elastic guard which, unlike to spring metal guards, will not interfere with the free taking of the hook by the fish, thus overcoming an objection to the spring metal guards in general use.

The invention consists of the features of construction, combination and arrangement of parts herein fully described and claimed, reference being had to the accompanying drawing in which:—

Figure 1:
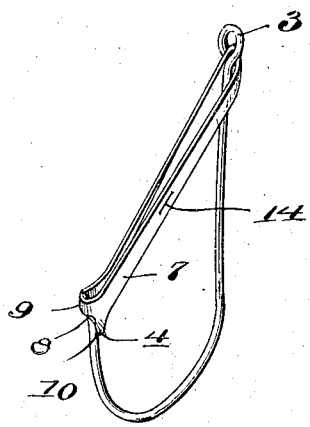
Figure 2:
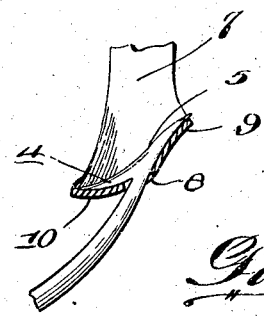
Figure 3:
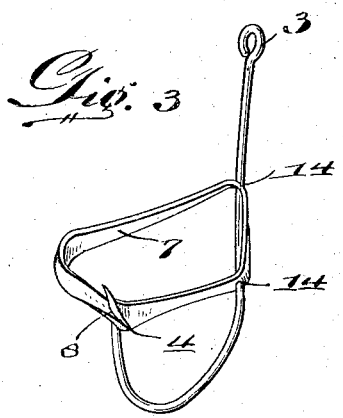
Figure 4:
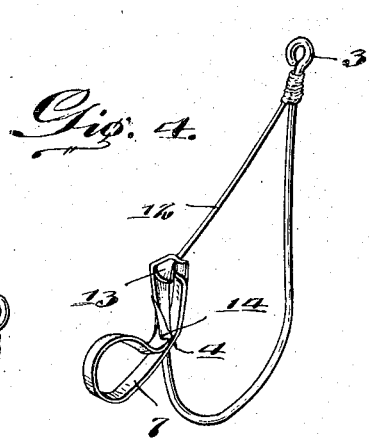
Figure 5:
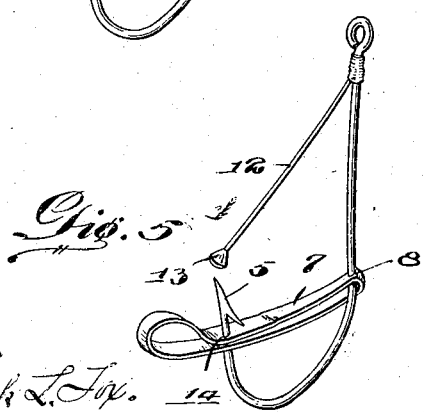

Figure 1 is a perspective view of a fish hook provided with a guard constructed in accordance with my invention. Fig. 2 is a detail section showing the engagement of the elastic guard with the barb of the hook. Fig. 3 is a perspective view illustrating a modification in the connection of the guard with the shank and also the capacity of the guard to engage different portions of the bill of the hook. Figs. 4 and 5 are views showing a modification in the adaptation of the elastic guard to a weedless hook.

Referring to the drawing, 1 designates the shank and 2 the bill of a fish hook of ordinary construction, wherein the shank 1 is provided with the usual eye 3 for attachment to the line, and the bill 2 is provided with the usual barb 4 including the point 5 and spur 6, as is customary in fish hooks of ordinary construction.

Heretofore it has been customary to employ guards for closing the space between the shank and barb of the hook, which guards are usually made of spring wire or flat spring metal and fastened at one end to the shank of the hook, the other end of the guard being free and arranged in a suitable manner to protect and prevent the point of the hook from catching in weeds or other obstructions. Some of these guards have knobs or enlargements at their free ends to increase their guarding surface and make them desirably blunt, while others are in the form of a looped wire, the bight portion of which is arranged to engage the barb of the hook. All of these spring metal guards, while to a greater or less extent efficient as weed fenders, are objectionable in that they do not yield readily to permit the fish to take the hook and in many cases oppose sufficient resistance to scare the fish away. For this reason, such guards are not properly efficient for use as bait retainers, particularly in holding live bait under certain conditions or in retaining certain kinds of bait which is dislodged easily unless the guard permits the fish to take the hook with ease and freedom. My invention overcomes these objections by the provision of an elastic guard, preferably an elastic band, which will cover the point of the hook and serve as an effective weed fender, which will also retain the bait in position, while yielding to permit the fish to easily take the hook, which is adjustable as occasion may require to retain the bait under different conditions, and which is also adapted for use in conjunction with spring weed guards to increase the efficiency of the same.

As shown, the guard 7 comprises a flat band 7 of rubber, possessing maximum toughness and elasticity, such as red rubber. This band is of a length to extend, when stretched or tensioned to a desired degree, between desired points on the shank and bill of the hook to close the entrance to the hook. One end of this band may be secured to the shank in any preferred manner, as by engaging it with the eye 3, while the other end of the band is formed in its bight portion with an opening 8, by which it may be engaged with the barb 4, as shown particularly in Figs. 1 and 2, where the guard band is shown as extended between the eye 3 and barb 4 and placed under a desired degree of tension. It will be observed that the opening 8 divides the adjacent end of the band into two portions, one of which, as the portion 9 is adapted to engage the outer surface of the point 5 of the hook, while the other portion 10 engages beneath the spur 6 of the barb of the hook.

By this construction and arrangement, the bight of the band at its point of connection of the barb will, according to the points of the band employed, partially or completely cover or inclose the barb to prevent same from catching in weeds or other obstructions, while affording a secure and positive engagement between the band and barb, whereby displacement of the band is prevented.

When employed to serve strictly as a weed guard, it will be evident that the band will offer sufficient resistance to ward off weeds and the like, but will be sufficiently elastic to yield while retaining its position so that the fish may take the hook with ease and facility and without sufficient resistance from the band to either prevent the barb from snaring the fish or to scare the fish away when attempting to take the bait.

When used as a bait retainer, the bait may be applied either via the shank or the barb of the hook and the guard arranged in position to hold it in place, and it will be evident that the guard will effectually prevent the bait from slipping off the hook. The apertured end of the bight of the band may also be slipped off the barb and slid to a desired position upon the bill of the hook to retain the bait in position, as shown in Fig. 3, without materially decreasing the tension of the band. Such adjustment renders the guard valuable and effective in retaining the live bait to hang through the lips or otherwise and the connection between which and the hook may be loose from engagement of the openings in the lips from strain, thus holding the bait more securely against possible loss. As also shown in Fig. 3, the opposite end of the band may be provided with an opening 11 for adjustable or slidable engagement with the shank of the hook, so that the band may be applied to the body of the shank instead of to the eye thereof when desired.

It will of course be apparent that the value of my improved guard resides in its form and elasticity, rendering it superior to spring metal bands in point of greater flexibility and resiliency, capacity of adjustment, and capability of receding by stretching from the point of the hook to permit the fish to take the hook without resistance or liability of being scared away. Furthermore, the adjustability of the guard adapts it for the various uses specified and other analogous uses, and enables a new guard to be applied with ease and convenience and at an extremely low cost.

In Figs. 4 and 5 I have shown the guard as adapted for use in connection with the spring metal guard of a hook of that type in which the guard 12 is formed of spring wire and provided at its free end with a guard head or enlargement 13. My improved elastic guard may be employed in this connection to increase the efficiency of the guard 12 by holding it closed to retain the bait in place or to more effectually increase the resistance of the guard 12 to opening movement under pressure of weeds, etc.

As shown, the elastic guard is provided with additional openings 14 at points intermediate its length whereby its end provided with the opening 8 may be engaged with the headed end of the guard 12, while the intermediate portions of the strands of the band may be engaged with the barb of the hook, thus connecting the free end of the guard 12 with the barb 4 to hold the guard 12 resiliently closed. It will be observed in this connection that the elastic guard is connected with the barb and the shank, its connection with the shank being indirectly through the spring wire guard 12. This construction also adapts the hook to be readily and conveniently swallowed by the fish without liability of the fish being scared by any play or motion of the free end of the guard 12, since this end of the metallic guard will be controlled by the elastic guard, as will be readily understood.

Instead of the elastic guard being perforated to engage the point of the hook, it may be disposed so as to be simply hung or caught upon the point of the hook, by which it will be retained in position. In the use of the elastic guard, either with or without a perforation to engage the hook, it may be disposed to engage the hook and hold the same under tension at any point by reason of its elasticity, the advantages of which will be apparent.

I claim:—

1. The combination with a fish hook, of a guard comprising an elastic band secured at one end to the shank of the hook, said band having an opening in the bight portion of its opposite end receiving the barb of the hook and dividing said portion into sections engaging the outer side of the point of the barb and the underside of the spur of the barb, said band being held under tension.

2. The combination with a fish hook, of a guard of elastic material directly engageable with the hook at any point under tension.

In testimony whereof I affix my signature in presence of two witnesses.

ROBERT D. PETERS.

Witnesses:
 ARTHUR PIERCE,
 O. D. HEPNER.

Copies of this patent may be obtained for five cents each, by addressing the "Commissioner of Patents, Washington, D. C."